United States Patent [19]

Sillitto

[11] Patent Number: 5,387,973
[45] Date of Patent: Feb. 7, 1995

[54] DETECTOR APPARATUS FOR DETECTING COHERENT POINT-SOURCE RADIATION

[75] Inventor: Hillary G. Sillitto, Edinburgh, United Kingdom

[73] Assignee: Ferranti plc, Cheshire, England

[21] Appl. No.: 699,135

[22] Filed: Dec. 18, 1984

[30] Foreign Application Priority Data

Dec. 23, 1983 [GB] United Kingdom ............... 8334459

[51] Int. Cl.$^6$ .............................................. G01B 9/02
[52] U.S. Cl. .................... 356/347; 356/363
[58] Field of Search ............... 356/346, 347, 353, 359, 356/363; 350/162.17, 162.19

[56] References Cited

U.S. PATENT DOCUMENTS

| 3,612,691 | 10/1971 | Schwartz | 356/346 |
|---|---|---|---|
| 3,829,219 | 8/1974 | Wyant | 356/353 |
| 4,128,337 | 12/1978 | Zehnpfennig | 356/346 |
| 4,200,395 | 4/1980 | Smith et al. | 356/363 |
| 4,332,473 | 6/1982 | Ono | 356/363 |

OTHER PUBLICATIONS

Hill et al., "Shearing Interferometer . . . Scattered Light", Jan. 1977, pp. 195–199, Applied Optics, vol. 16, #1.

Patorski et al., "Collimation Test . . . Shearing Interferometer", May 1976, pp. 1234–1240, Appl. Opt., vol. 15, #5.

Hariharan et al., "Double Grating Interferometers . . . Beams", May 1975, pp. 148–152, Opt. Communications, vol. 14, #1.

*Primary Examiner*—Nelson Moskowitz
*Attorney, Agent, or Firm*—Kerkam, Stowell, Kondracki & Clarke

[57] ABSTRACT

Detector apparatus includes a diffraction grating (11) having a period such that the incidence of coherent point-source radiation upon it produces a number of spaced self-images of the grating behind it. A Moiré grating (12) is placed to coincide with one of these self-images and a detector array (13–16) is placed behind the Moiré grating to detect the resulting interference fringes.

5 Claims, 1 Drawing Sheet

DETECTOR APPARATUS FOR DETECTING COHERENT POINT-SOURCE RADIATION

Coherent and compact sources of radiation in the form of lasers are being used increasingly, particularly in military applications, for the "designation" of an object or target or for range-finding. To do this, radiation from a laser is directed at the target, and a proportion of that incident radiation is scattered and may be detected by a suitable laser receiver. In a military application it is likely that a target will be so identified for the purpose of attack. It is therefore highly desirable from the defensive point of view that a potential target should receive warning of its designation. It is equally important that any warning system should not produce too many false warnings triggered by other forms of light source, or by nearby regions being illuminated by a laser not pointed directly at the target.

The beam of radiation from a laser has several characteristics which will tend to distinguish it from other forms of light source. Laser radiation will almost certainly be more intense than that from other artificial sources, and the source is usually very small. In addition laser radiation is coherent. Use may be made of these characteristics to identify radiation from a laser, and it is an object of the present invention to provide detector apparatus for detecting radiation from a laser source to the exclusion of radiation from other sources.

According to the present invention there is provided detector apparatus for detecting coherent point source radiation, which includes a diffraction grating having a period such that the incidence of spatially coherent radiation on the grating produces a number of self-images of the grating spaced apart from one another behind the grating, and detector means located behind the first grating to coincide with one of said self-images at a distance which defines the maximum size of radiation source which may be detected.

The invention will now be described with reference to the accompanying drawings, in which.

Radiation received from a distant source incident upon a diffraction grating produces interference fringes behind the grating, the visibility of which is zero when the "wavefront shear" D is given by $$D = \frac{1.22w}{2\alpha} \quad (1)$$

where w is the wavelength of the radiation and $2\alpha$ is the full cone angle subtended by the radiation source at the grating. By way of example, if the wavelength of radiation to be detected is 1 micron, and the source subtense is 0.5 mRad, then equation 1 gives D equal to 2.44 mm.

For radiation of other wavelengths D varies in proportion to the wavelength.

Figure 1:
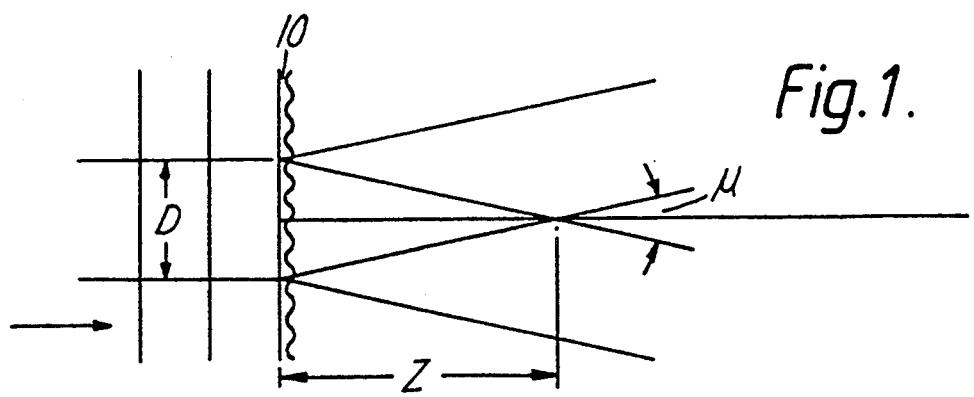
FIG. 1 illustrates the principle of operation of the invention.

FIG. 1 illustrates the production of wavefront shear using a diffraction grating 10. Incident radiation from the distant source arrives in the direction of the arrow. In passing through the grating a number of diffracted beams are produced, of different orders. Only one first order beam and the undiffracted beam will be considered. Considering the wavefront shear D, which occurs a distance Z behind the grating, and for small values of diffraction angle $\mu$, then $$D = Z\mu \quad (2)$$

Now the diffraction angle $\mu$ is given by:

$$d \sin \mu = pw \quad (3)$$

where d is the period of the grating and p is the order of the diffracted beam.

$$\text{Hence } \mu = \frac{w}{d}, \text{ approximately} \quad (4)$$

Substituting this in equation (2), then $$D = \frac{Zw}{d} \quad (5)$$

Comparing equations (1) and (5), it will be seen that $$D = \frac{Zw}{d} = \frac{1.22w}{2\alpha}$$

$$\text{so that } Z = \frac{1.22d}{2\alpha} \quad (6)$$

$$\text{or } d = \frac{2\alpha Z}{1.22} \quad (7)$$

Both of these are independent of the wavelength of the radiation and depend only on the angular size of the source.

It may be seen that interference between the undiffracted and first order beams will result in an interference fringe system whose periodicity is identical to that of the diffraction grating. Because of the presence of other diffraction beams, this fringe pattern is not visible throughout space, but only at distances equal to an integral multiple of $d^2/2w$ from the grating, those patterns at odd multiples Gf this distance being 180° out of phase with the original grating. These distinct and separate fringe patterns are known as "self-images" and their properties are analysed in a paper by R. F. Edgar entitled "The Fresnel diffraction images of periodic structures" published in Optica Acta, 1969, Volume 16, No. 3 at pages 281 to 287.

Figure 2:
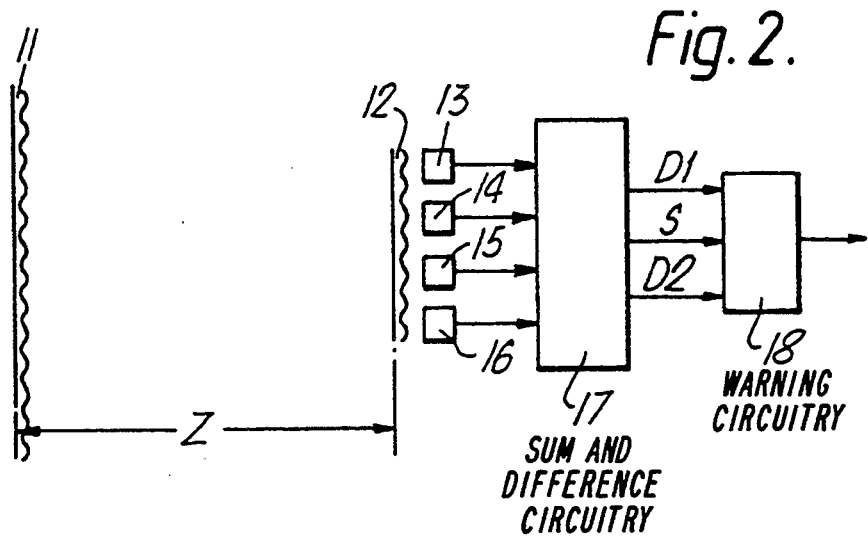
FIG. 2 is a schematic view of one form of detector apparatus.

In practical terms the detector apparatus may be very simple. FIG. 2 shows a schematic view of one form of such apparatus. As shown in FIG. 2 the diffraction grating 11 and Moiré grating 12 are arranged almost parallel to one another with their rulings vertical, and separated from one another by a distance Z determined as above. The two gratings are of the same period and have their lines almost parallel. The Moiré grating is oriented with respect to the diffraction grating so that the grating rulings are at a slight angle to the self-image. When the grating is viewed from behind, Moiré fringes are observed whose period depends upon the relative orientation of the Moiré grating and the self-image of the diffraction grating. This angle is set to produce a Moiré fringe period compatible with the pitch of the detector array elements, and would normally be chosen such that one complete fringe cycle would cover four detector elements. The Moiré fringes lie approximately at right angles to the grating rulings. By way of example for a source size of 0.5 m Rad, a wavelength of one microns and a grating period of 30 microns, then the distance Z would be approximately 75 mm. Immediately behind the second grating is positioned a row of four radiation sensitive detectors 13, 14, 15 and 16. These are electrically connected to circuitry 17 which provides a signal D1 representing the difference between the outputs of detector 13 and 15 and a signal D2 representing the difference between the outputs of detector 14 and 16. A sum output S represents the sum of the outputs of all four detectors. Suitable warning circuitry 18 is provided to give an alarm when either or both of signals D1 and D2 varies by more than, say, 10% compared with the mean signal S/4.

The field of view of the detector apparatus described above depends upon the distance Z and on the dimensions of the front grating 11. It may be of the order of 60°, in which case six such detector could be used to give all-round coverage.

It will be seen that no lenses are used in conjunction with the detector apparatus. This is a considerable advantage in cost and complexity, and enables the large field of view to be used fully. However, the detector may be placed behind collecting optics to give increased sensitivity, though at the expense of a reduced field of view. Such a device is suitable for use in the vicinity of the exit pupil of a focal telescope. The same principles may be applied in a slightly different configuration to work in a coverging beam of radiation.

The period of the grating is determined in accordance with the available desired separation between the two gratings and the maximum angular size of source which it is desired to interpret as a "point source". Period is wavelength-independent. The self-image spacing is wavelength-dependent, but this is only of secondary importance as many self-images will be contained within the distance Z.

Figure 3:
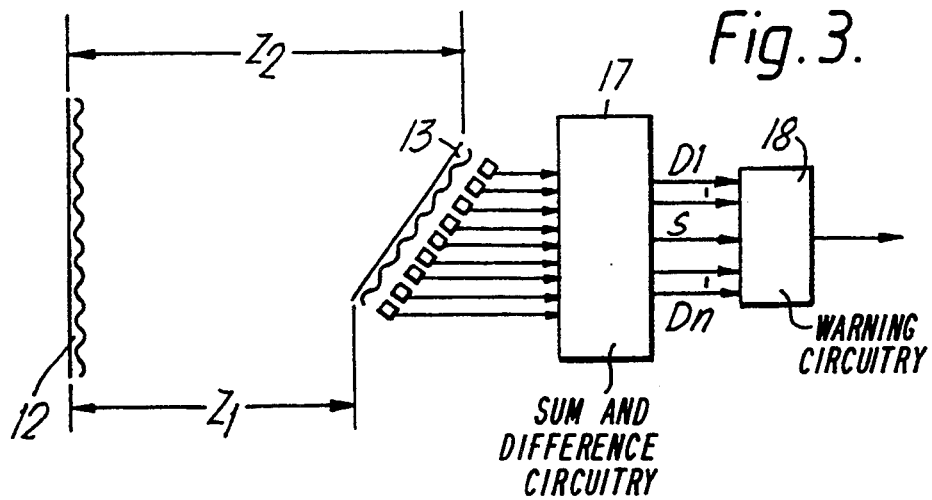
FIG. 3 is a schematic view of a second form of the apparatus.

In general most lasers used for ranging or target marking operate in the infra-red region so as to be less affected by smoke or mist, and hence the detector apparatus described above will detect most lasers in common use. The detector apparatus described may be modified, however, to be less wavelength-dependent as shown schematically in FIG. 3. From FIG. 3 it will De seen that there are two basic differences from the previous embodiment. Firstly, the second grating is tilted so that one edge is a distance $Z_1$ from the first grating whilst the opposite edge is a distance $Z_2$ from the first grating. $Z_1$ and $Z_2$ are such that the average distance is the value Z used in the previous embodiment. The tilted arrangement ensures that at least part of the second grating will be at a self-image point regardless of the wavelength of the radiation, within reasonable limits. By way of example the tilt distance $(Z_2-Z_1)$ for a wavelength of 0.6 microns would be equal to or greater than 1.5 mm.

A more elaborate detector array is necessary since it is not known which area of the grating will be located at a self-image point and hence produce fringes. It may be necessary to provide, say, 20 detectors arranged in a line from top to bottom of the second grating. These would be connected as before to provide difference signals from next-but-one pairs of detectors, together with sun signal. The alarm condition would, as before, be produced by a variation in one or more of the difference signals relative to the mean signal level.

The invention described above operates on the basic principle that any very intense point source of radiation with narrow spectral width is likely to be a laser. Larger intense sources, such as the sun for example, will produce only low contrast fringes which will not give rise to the alarm condition. The processing circuitry will also be tuned to detect pulses of radiation with duration characteristics of lasers (e.g. of the order of 20 nanoseconds for most rangefinders). A major purpose of the invention is to distinguish between a direct attack in which a laser is pointed at or very close to the detector, and radiation received by way of ground scatter from some region being illuminated by the laser not aimed at or close to the detector.

If it is desired to detect continuous laser illumination, modulation may be introduced into the electronics by moving either grating in its own plane such that the Moiré fringe pattern moves across the detector array, or by rotating the entire detector assembly about an axis parallel to the grating rulings to produce the same effect. Alternatively a scanning technique equivalent to one or other of these mechanisms may be used.

The detector means described above is just one way of detecting the interference fringes produced by the diffraction grating. Another way of doing this would be to use an array of radiation-sensitive detector elements spaced apart so that three or four detector elements covered one cycle of the interference fringe pattern. This could, for example, be a distance as small as 30 microns. Although this is difficult with present day technology, detector elements of this small size will be available in the future. Other forms of detector means may also be used.

What we claim is:

1. Detector apparatus for detecting coherent point-source radiation, which includes a diffraction grating which produces a number of self-images of the grating spaced apart from one another behind the grating, and detector means located behind the diffraction grating to coincide with one of said self-images at a distance which defines the required maximum size of radiation source which may be detected, and in which the detector means includes a Moiré grating of the same period as the diffraction grating and an array of radiation detectors located behind the Moiré grating and operable to detect Moiré fringes produced by the interaction of the Moiré grating with a self-image of the diffraction grating.

2. Apparatus as claimed in claim 1 in which the diffraction and Moiré gratings are almost parallel to one another, the detector array incuding at least two pairs of detectors.

3. Apparatus as claimed in claim 1 in which the Moiré grating is tilted relative to the diffraction grating, the detector array including a plurality of pairs of detectors.

4. Apparatus as claimed in claim 1 in which the detector means includes circuit means responsive to the outputs of the detectors to provide signals indicating the difference between the outputs of each of the alternate pairs of detector and a third signal representing the mean output of all the detectors.

5. Apparatus as claimed in claim 4 in which the detector means includes an alarm circuit operable to provide an alarm signal if either of the difference signals varies relative to the mean output by more than a predetermined amount.

* * * * *